United States Patent
Chang

(10) Patent No.: US 10,745,199 B2
(45) Date of Patent: Aug. 18, 2020

(54) MATERIAL PLACEMENT DEVICE

(71) Applicant: Pu-Lin Chang, Tainan (TW)

(72) Inventor: Pu-Lin Chang, Tainan (TW)

( * ) Notice: Subject to any disclaimer, the term of this patent is extended or adjusted under 35 U.S.C. 154(b) by 17 days.

(21) Appl. No.: 15/826,957

(22) Filed: Nov. 30, 2017

(65) Prior Publication Data

US 2019/0071249 A1 Mar. 7, 2019

(30) Foreign Application Priority Data

Sep. 7, 2017 (TW) .............................. 106130652 A

(51) Int. Cl.
*B65G 49/08* (2006.01)
*B65G 1/04* (2006.01)
*B65G 1/10* (2006.01)

(52) U.S. Cl.
CPC ............. *B65G 1/0407* (2013.01); *B65G 1/10* (2013.01)

(58) Field of Classification Search
CPC .............................. B65G 49/085; B60D 1/04
USPC ..................................... 414/331.13
See application file for complete search history.

(56) References Cited

U.S. PATENT DOCUMENTS

| | | | | |
|---|---|---|---|---|
| 4,256,355 A | * | 3/1981 | Yamaguchi | A47B 53/02 104/287 |
| 5,007,785 A | * | 4/1991 | van der Schoot | B65G 61/00 414/331.11 |
| 6,042,321 A | * | 3/2000 | Labell | B65G 1/0414 414/276 |
| 7,004,489 B2 | * | 2/2006 | Brown | B60D 1/00 280/491.3 |
| 2004/0261650 A1 | * | 12/2004 | Al-Kaabi | B61D 3/10 105/30 |
| 2013/0162117 A1 | * | 6/2013 | Hara | H01L 21/6773 312/31 |
| 2017/0012258 A1 | * | 1/2017 | Shimizu | H01M 2/1077 |

* cited by examiner

*Primary Examiner* — Saul Rodriguez
*Assistant Examiner* — Willie Berry, Jr.
(74) *Attorney, Agent, or Firm* — Muncy, Geissler, Olds & Lowe, P.C.

(57) ABSTRACT

A material placement device is configured for placement of a plurality of materials from the preceding process, and includes a slide rail assembly configured to be disposed on one side of an aisle of a place, a plurality of storage units slidably disposed on the slide rail assembly and movable toward or away from each other, and a plurality of fixing units each of which detachably fixes two adjacent ones of the storage units. Each storage unit includes a storage portion defining a plurality of storage spaces for receiving and storing the materials.

1 Claim, 6 Drawing Sheets

MATERIAL PLACEMENT DEVICE

CROSS-REFERENCE TO RELATED APPLICATION

This application claims priority of Taiwanese Patent Application No. 106130652, filed on Sep. 7, 2017.

FIELD

The disclosure relates to a placement device, more particularly to a material placement device disposed on a specific place for storing materials such as screws, nuts, etc.

BACKGROUND

In a traditional manufacturing process, the completion of a product must undergo many processes, and the connection in the middle of each process often must rely on storage, transportation and other processes. Taking for example the production process of a screw and nut industry, a semi-finished product outputted from the production machine is usually placed in a carrying box. After a predetermined quantity is accumulated, it is transported by a transport unit to a predetermined location for stacking. Then, an operator will take them out for processing or inspection, sort them out according to their type, and put them into several different categories of carrying boxes. Finally, the carrying boxes loaded with the materials are stacked.

The weight of each carrying box loaded with the materials may reach several hundreds of kilograms depending on the type of material it carries, so that a stacking machine must be used for its transport operation. To prevent rocking due to, for example, improper operation, earthquake or accidental bumping or collision, which can cause the carrying boxes to topple and create a safety hazard, the height of stacking the carrying boxes is limited. Further, the stacking height of the carrying boxes is also restricted by the operating height of the stacking machine. If the stacking machine is stacked high with heavy products, such as screws, nuts, etc., the center of gravity after stacking is also high. The higher the gravity, the more it is likely to topple easily. Because the stacking height of the carrying boxes is restricted, the carrying boxes will occupy a substantial space in the factory or warehouse. Further, during storage of the materials, they are usually placed in a scattering manner, so that it is difficult to sort them out according to their respective types.

In order to solve the above problems, fixed-type material racks for placement of the materials are employed. The fixed-type material racks can facilitate sorting of the materials, and can permit the carrying boxes to stack in a high place so as to make an efficient use of the storage space. However, the fixed-type material racks must be spaced apart from each other to allow an aisle space for movement of the stacking machine during transport of the carrying boxes. When the number of the fixed-type material racks becomes large, the required number of aisle space is also correspondingly increased, thereby resulting in waste of space in the factory or warehouse. Further, the fixed-type material racks have poor stability problem, especially, because Taiwan is in a seismic zone, when earthquake comes, a single fixed-type material rack is prone to topple due to unstable center of gravity, resulting in accidental disaster for the personnel and products. Moreover, the flexibility of the fixed-type material racks is also not good. When a carrying box is stacked in a high place, the stacking machine must consume a longer transport time to move the carrying box to and fro the material rack, thereby resulting in inefficient transport.

SUMMARY

Therefore, an object of the present disclosure is to provide a material placement device that is capable of overcoming the aforesaid drawbacks of the prior art.

Accordingly, a material placement device of this disclosure is configured to cooperate with a loading and unloading unit which is disposed in proximity thereof and is configured for placement of a plurality of materials from the preceding process. The material placement device includes a slide rail assembly configured to be disposed on one side of an aisle of a place, a plurality of storage units slidably disposed on the slide rail assembly and movable toward or away from each other, and a plurality of fixing units each of which detachably fixes two adjacent ones of the storage units. Each of the storage units includes a storage portion defining a plurality of storage spaces for receiving and storing the materials.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
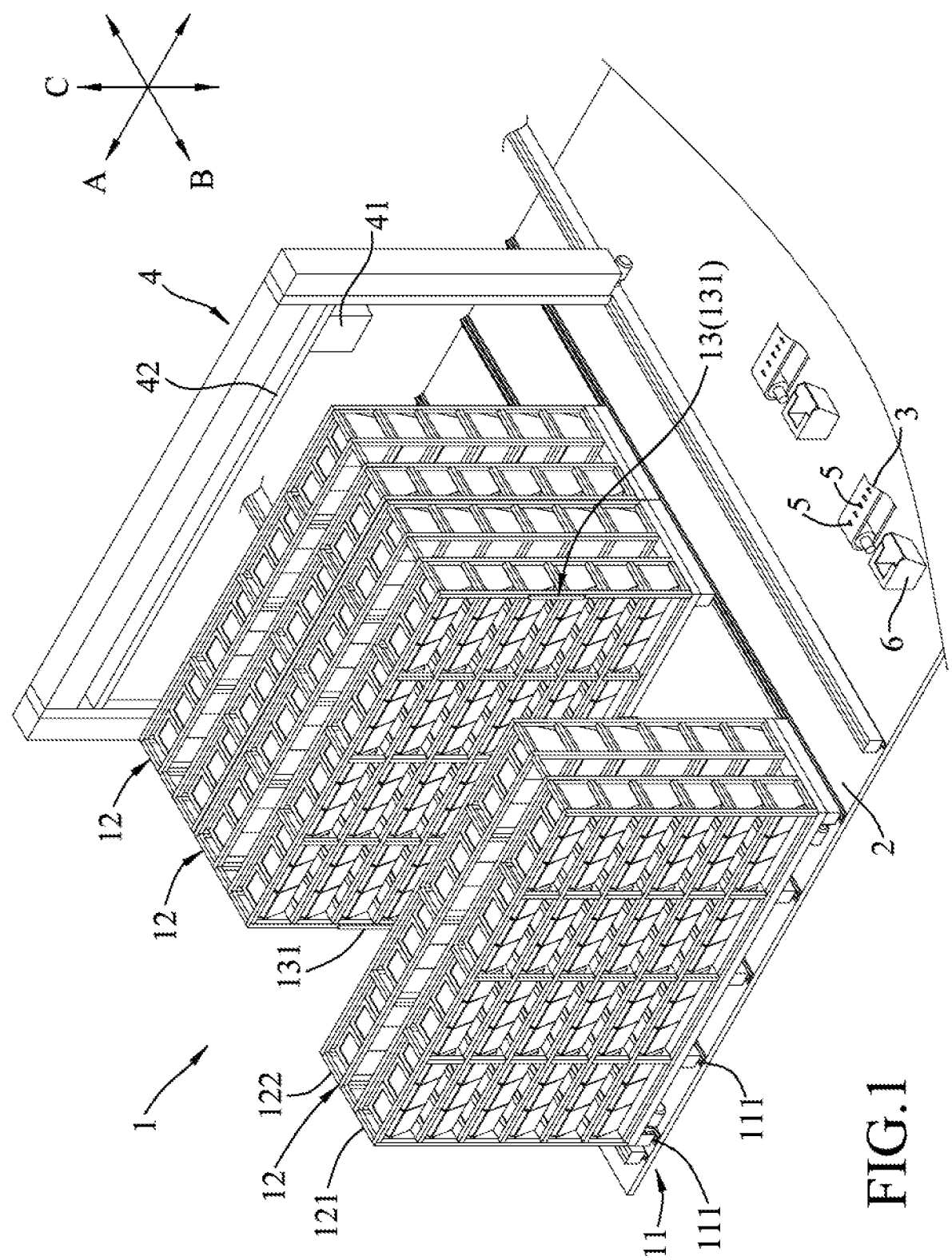
FIG. 1 is a fragmentary perspective view, illustrating relations among a material placement device according to the first embodiment of this disclosure, a conveying unit, a loading and unloading unit and a plurality of carrying boxes.
Figure 2:
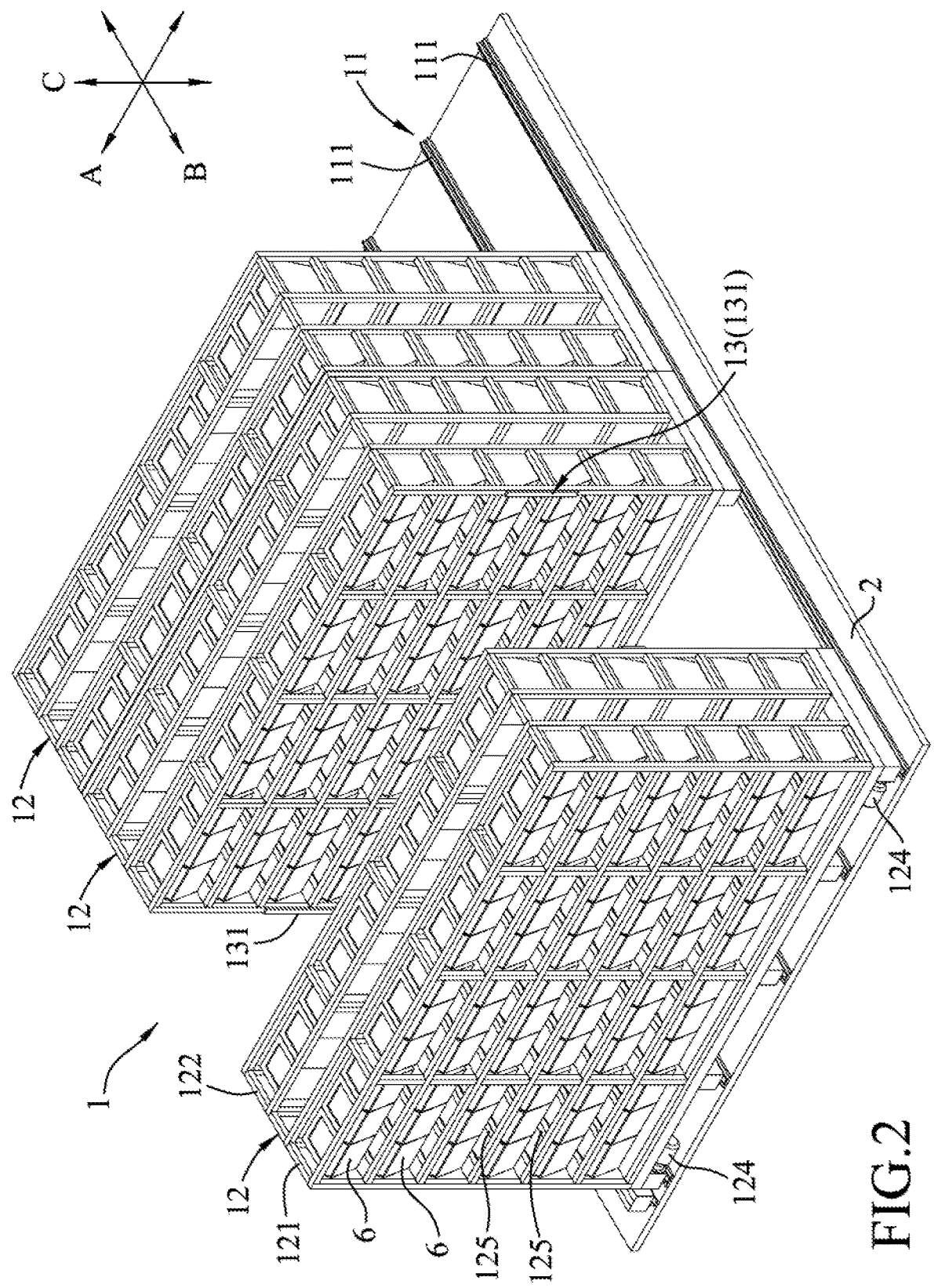
FIG. 2 is a fragmentary perspective view of the first embodiment.
Figure 3:
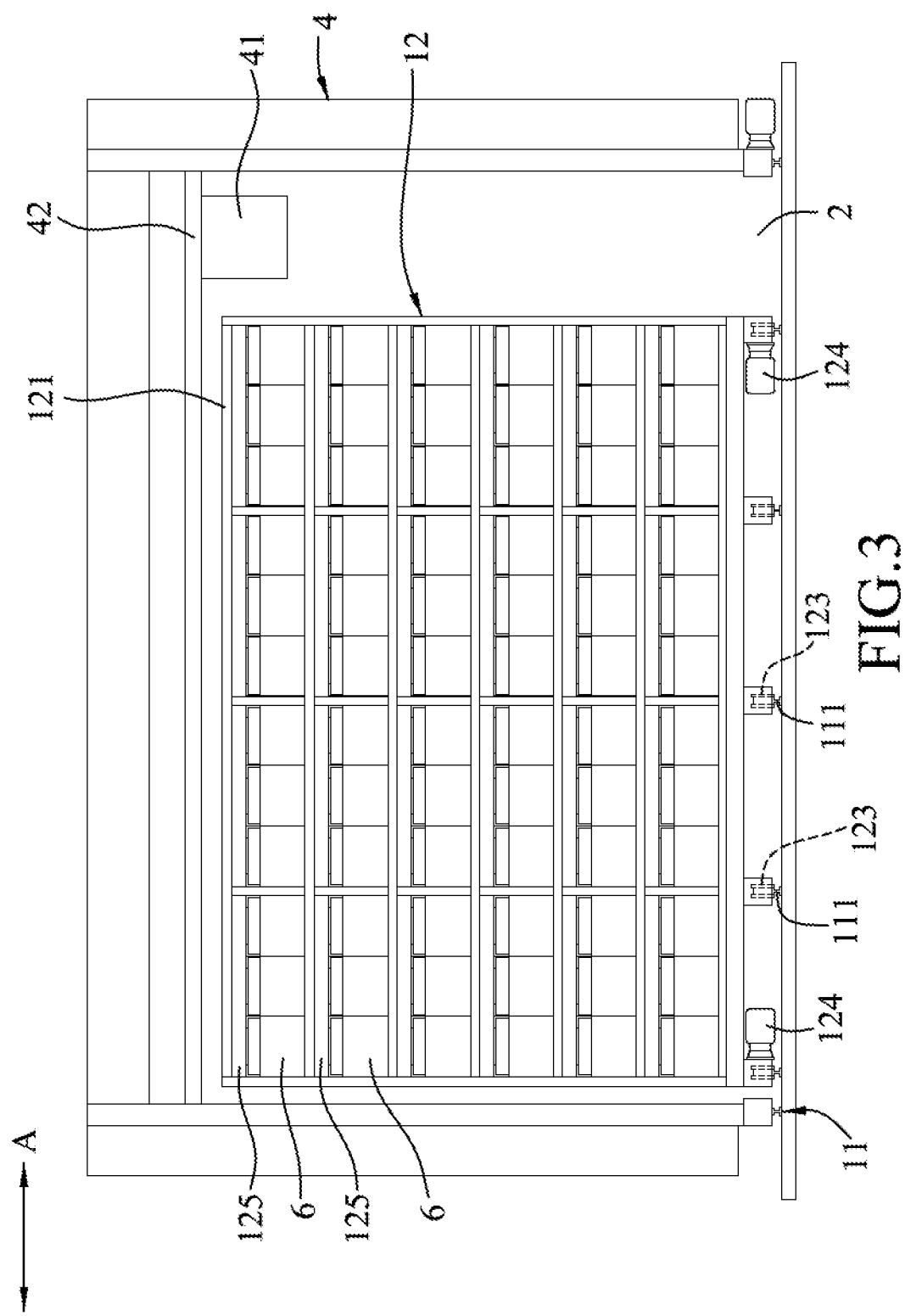
FIG. 3 is a front view of the first embodiment.
Figure 4:
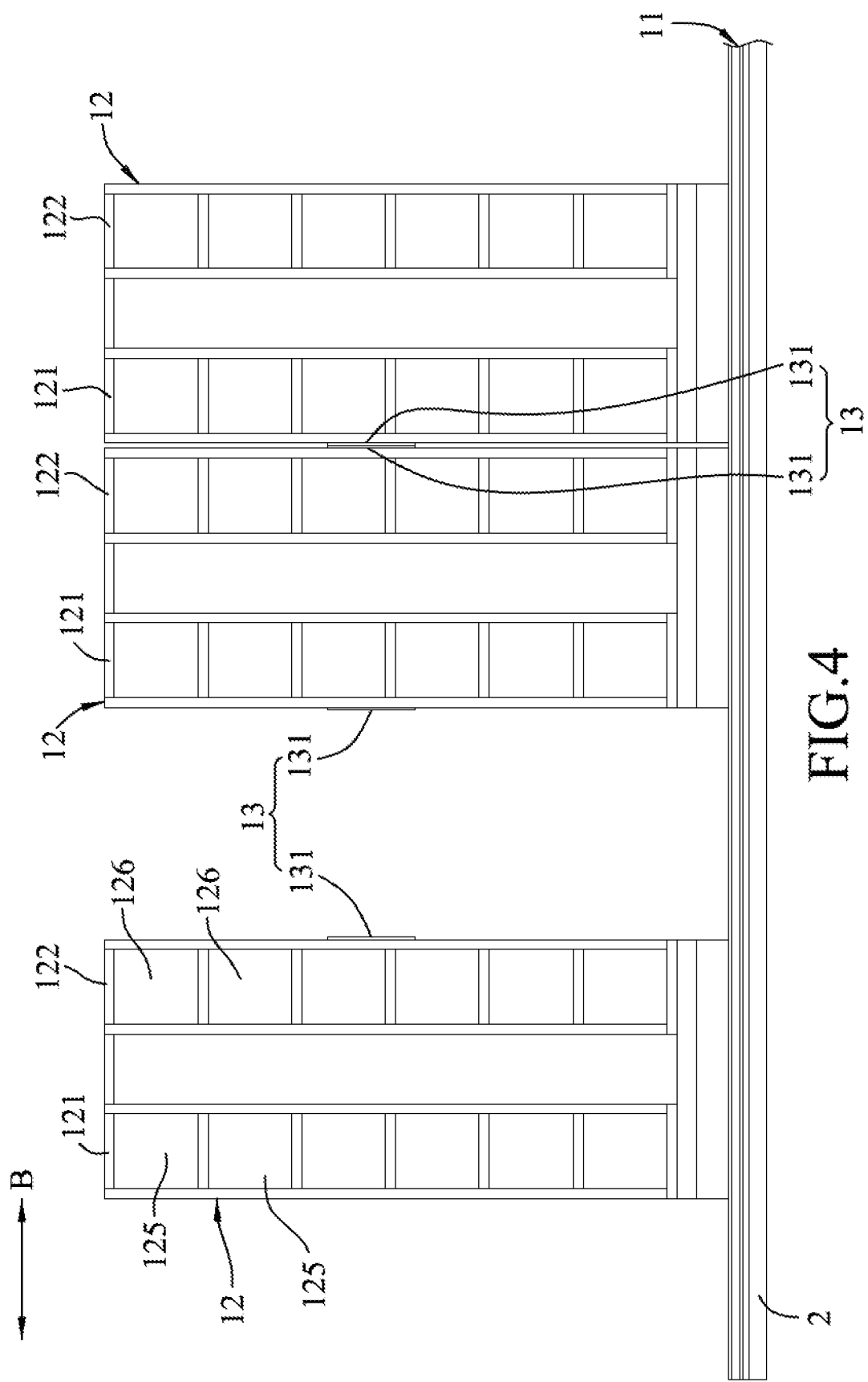
FIG. 4 is a fragmentary side view of the first embodiment, illustrating relation of a fixing unit with storage units.

Before the present disclosure is described in greater detail with reference to the accompanying embodiments, it should be noted herein that like elements are denoted by the same reference numerals throughout the disclosure.

Referring to FIGS. 1 to 4, a material placement device 1 according to the first embodiment of the present disclosure is disposed on one side of an aisle 2 of a place, such as a factory or warehouse, and can be used to cooperate with a conveying unit 3 and a loading and unloading unit 4. The conveying unit 3 is disposed on the other side of the aisle 2 opposite to the material placement device 1, and is used for conveying materials 5, such as screws, nuts, bolts, etc., in semi-finished form out of a production machine (not shown) along a first direction (A). In some manufacturing industries, the materials 5 may be directly produced and outputted by the production machine, so that the installation of the conveying unit 3 is not needed. The materials 5 can be placed in a plurality of carrying boxes 6 for storage and transport. The loading and unloading unit 4 is disposed in proximity to the material placement device 1, and is reciprocally movable along a second direction (B) transverse to the first direction (A). In this embodiment, the first direction (A) is a left-right direction, and the second direction (B) is a front-rear direction. The loading and unloading unit 4 includes a guide rail 42 extending along the first direction (A), and an overhead crane 41 slidably mounted on the guide rail 42 for transporting the carrying boxes 6. Apart from being slidable on the guide rail 42 along the first direction (A), the overhead crane 41 can also move up, down, left and right relative to the guide rail 42. However, the overhead crane 41 may also be a conventional fixed-type overhead crane.

The first embodiment of the material placement device 1 comprises a slide rail assembly 11, a plurality of storage units 12, and a plurality of fixing units 13.

The slide rail assembly 11 is disposed on a left side of the aisle 2, and includes a plurality of slide rails 111 spaced apart from each other along the first direction (A). Each of the slide rails 111 extends along the second direction (B).

The storage units 12 are slidably disposed on the slide rails 111, and are movable toward or away from each other along the second direction (B). Each of the storage units 12 includes a first storage portion 121, a second storage portion 122, a plurality of rollers 123, and a plurality of power sources 124.

The first storage portion 121 is a support frame formed by assembling together a plurality of metal rods, and spans the slide rails 111. The first storage portion 121 defines a plurality of first storage spaces 125 spaced apart from each other along a top-bottom direction (C) transverse to the first and second directions (A, B) for receiving a plurality of the carrying boxes 6. Each first storage space 125 has an opening facing forward.

The second storage portion 122 is connected to a rear side of the first storage portion 121, and has a structure similar to that of the first storage portion 121. The second storage portion 122 defines a plurality of second storage spaces 126 spaced apart from each other along the top-bottom direction (C) for receiving a plurality of the carrying boxes 6. Each second storage space 126 has an opening facing rearward and opposite to the opening of each first storage space 125.

The rollers 123 are disposed on bottom sides of the first and second storage portions 121, 122, and are rollable on the slide rails 111. The rollers 123 are used for integrally moving the first and second storage portions 121, 122 on the slide rails 111 along the second direction (B).

The power sources 124 are also disposed on the bottom sides of the first and second storage portions 121, 122 for driving rotation of some of the rollers 123 so as to move the first and second storage portions 121, 122. In this embodiment, each power source 124 is a motor driving device powered by electricity to move the storage units 12. Alternatively, each power source 124 may be a conventional motor that drives a chain or sprocket wheel to move the storage units 12, or may be a hydraulic motor. Similar effect as that of the electric motor may be achieved. The power source 124 is not limited to what is disclosed herein.

The fixing units 13 are used for detachably fixing each two adjacent ones of the storage units 12. Each of the fixing units 13 includes at least two electromagnets 131 respectively disposed on two adjacent ones of the storage units 12. In this embodiment, four electromagnets 131 (only two are visible in FIG. 1) are used, two of which are disposed on two opposite sides of one of the two adjacent ones of the storage units 12, while the other two of which are disposed on two opposite sides of the other one of the two adjacent ones of the storage units 12. After current passes through the electromagnets 131, the electromagnets 131 will generate magnetic forces that attract each other so as to fixedly connect the two adjacent storage units 12. In practice, the number of the electromagnets 131 may be increased according to the requirement and the loading weight of the materials 5 so as to stabilize connection between the two adjacent storage units 12.

To use the material placement device 1 of this embodiment, a storage unit 12 desired for placing the materials 5 is first separated from an adjacent storage unit 12 so as to expose the first storage space 125 and the second storage space 126 of the desired storage unit 12. Next, the overhead crane 41 is operated to move and place the carrying box 6 loaded with the materials 5 in the first or second storage space 125, 126 of the desired storage unit 12. Through the repeated transport operations of the loading and unloading unit 4, the carrying boxes 6 can be placed and stored on the desired storage unit 12. After the storing operation is completed, the desired storage unit 12 is connected to the other unused storage units 12, thereby improving space utilization efficiency of the place.

It should be noted herein that an operator may place a plurality of identification labels (not shown) on the first and second storage portions 121, 122 of each storage unit 12, so that the operator can separate and sort the materials 5 to be stored according to the labels for easy management thereof. A computer program may be used to control the position and stock of the materials 5.

Moreover, because the storage units 12 are movable on the slide rail assembly 11, before the operation, one of the storage units 12 may be moved close to the conveying unit 3, so that there is no need for the loading and unloading unit 4 to move a long distance during transport of the carrying boxes 6, thereby reducing the transport time. When processing of the materials 5 in the storage unit 12 is necessary, the storage unit 12 can also be moved close to an operation area. Hence, use of the material placement device 1 of this disclosure is very flexible.

After the storage of the materials 5 on the one of the storage units 12 is completed, the one of the storage units 12 and an adjacent storage unit 12 are moved close to each other, and are fixed to each other through the fixing unit 13. Because the ratio between the height and the width of the two adjacent storage units 12 after the connection is small, the stability thereof is increased. When some unexpected condition arise, such as earthquake or vibration generated due to collision of equipments, the storage units 12 will not easily topple, so that storage of the materials 5 is relatively secure. Further, all the storage units 12 may also be fixed together through the fixing units 13, so that, apart from having good stability and good vibration resistance, the positions of the storage units 12 may be more concentrated. Simultaneously, because the storage units 12 are movable, there is only need to reserve one aisle for operation of the loading and unloading unit 4 when drawing a plan for the place, and there is no need to reserve an aisle between each two adjacent ones of the storage units 12. As such, the space in the place can be saved, thereby enhancing the space utilization efficiency of the place.

Figure 5:
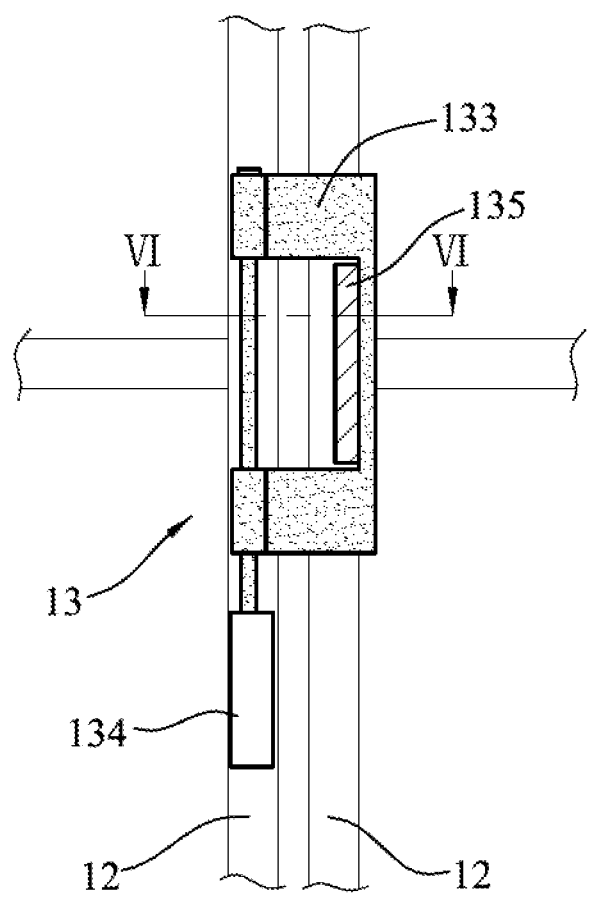
FIG. 5 is a fragmentary side view of a material placement device according to the second embodiment of this disclosure, illustrating relation of a fixing unit with storage units.
Figure 6:
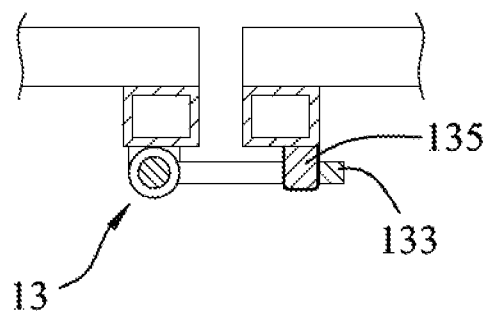
FIG. 6 is a sectional view taken along line VI-VI of FIG. 5, illustrating a locking ring and an engaging bar of the fixing unit in an engaging position.
Figure 7:
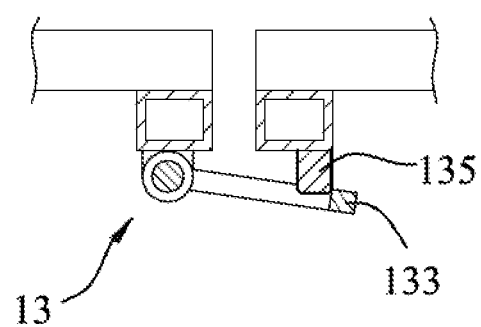
FIG. 7 is a view similar to FIG. 6, but illustrating the locking ring being pivoted away from the engaging bar.

Referring to FIGS. 5 to 7, the second embodiment of the material placement device 1 according to the present disclosure has a structure substantially identical to that of the first embodiment, and only differs in the fixing method of the storage units 12. In the second embodiment, each of the fixing units 13 includes a locking ring 133 pivotally disposed on one of the storage units 12, a control member 134 connected to the locking ring 133 for controlling pivotal movement of the locking ring 133, and an engaging bar 135 disposed on an adjacent one of the storage units 12.

The control member 134 can receive a remote control signal from a user to drive the locking ring 133 to pivot and engage with or disengage from the engaging bar 135 so as to lock or unlock the two adjacent storage units 12. In this embodiment, the control member 134 is a pneumatic valve that can receive signal and activate. The advantage of this design is that the user does not need to directly contact the fixing unit 13. When the fixing unit 13 is disposed at a high place, the user can use a remote control to operate the fixing unit 13, and there is no need to climb to the high place for performing the locking and unlocking operations of the fixing unit 13, so that the operation thereof is safe. In an alternative form of the second embodiment, each two adjacent ones of the storage units 12 may be provided with a plurality of the fixing units 13 which can simultaneously receive a signal and which can simultaneously operate, so that not only the stability of the storage units 12 can be increased, but also the operation is relatively convenient and safe.

In sum, the storage units 12 of the material placement device 1 of this disclosure can permit placement and stacking of the materials 5 at high places, and can be moved to any desired locations through the sliding movement of the storage units 12 on the slide rails 111. When the storage units 12 are not in use, they can be moved close to each other, thereby increasing the space utilization efficiency of the place. Further, because the storage units 12 are slidable on the slide rails 111, there is no need to move the loading and unloading unit 4 at a long distance for transporting the carrying boxes 6 loaded with the materials 5, thereby reducing the transport time. Additionally, the fixing units 13 can assemble and fix the storage units 12 together so that the overall stability of the storage units 12 can be increased. When some unexpected condition arise, such as earthquake, because each two adjacent ones of the storage units 12 are interlocked to form a large integral body, the anti-vibration capability is significantly increased. Hence, the object of this disclosure can indeed be achieved.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A material placement device configured to cooperate with a loading and unloading unit which is disposed in proximity thereof and configured for placement of a plurality of carrying boxes loaded with materials, said material placement device comprising:

a slide rail assembly configured to be disposed on one side of an aisle of a place;

a plurality of storage units slidably disposed on said slide rail assembly and movable toward or away from each other, each of said storage units including a first storage portion defining a plurality of first storage spaces for receiving and storing the carrying boxes, and a second storage portion connected to said first storage portion and defining a plurality of second storage spaces for receiving and storing the carrying boxes; and a plurality of fixing units each of which detachably fixes two adjacent ones of said storage units such that said two adjacent ones of said storage units abut against each other;

wherein each of said first and second storage portions extends along a first direction, said slide rail assembly extends along a second direction transverse to the first direction, and said storage units are slidable on said slide rail assembly along the second direction;

wherein each of said first and second storage portions has a long side extending in the first direction, and a short side extending in the second direction, each of said fixing units detachably fixing said long sides of the two adjacent ones of said storage units;

wherein each of said first and second storage spaces further has an opening formed in said long side thereof, said opening of each of said first storage spaces and said opening of each of said second storage spaces being opposite to each other in the second direction and being parallel to an extending direction of said slide rail assembly;

wherein said openings of said first storage portion of one of said storage units face said openings of said second storage portion of an adjacent one of said storage units when each of said fixing units fixes the two adjacent ones of said storage units;

wherein each of said first and second storage portions is a support frame;

wherein each of said storage units further includes a plurality of rollers disposed on bottom sides of said first and second storage portions and rollable on said slide rail assembly, and a plurality of power sources for driving said rollers to roll on said slide rail assembly, each of said power sources being a motor; and wherein each of said fixing units includes a locking ring pivotally disposed on one of said two adjacent ones of said storage units, a control member connected to said locking ring for controlling pivoting movement of said locking ring, and an engaging bar disposed on the other one of said two adjacent ones of said storage units for releasable engagement with said locking ring.

* * * * *